US011961325B2

(12) United States Patent
Lin et al.

(10) Patent No.: US 11,961,325 B2
(45) Date of Patent: Apr. 16, 2024

(54) IMAGE PROCESSING METHOD AND APPARATUS, COMPUTER-READABLE MEDIUM, AND ELECTRONIC DEVICE

(71) Applicant: TENCENT TECHNOLOGY (SHENZHEN) COMPANY LIMITED, Shenzhen (CN)

(72) Inventors: Xiangkai Lin, Shenzhen (CN); Linchao Bao, Shenzhen (CN); Yonggen Ling, Shenzhen (CN); Yibing Song, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 539 days.

(21) Appl. No.: 17/184,571

(22) Filed: Feb. 24, 2021

(65) Prior Publication Data
US 2021/0183044 A1 Jun. 17, 2021

Related U.S. Application Data

(63) Continuation of application No. PCT/CN2019/121935, filed on Nov. 29, 2019.

(30) Foreign Application Priority Data

Nov. 30, 2018 (CN) .......................... 201811455877.4

(51) Int. Cl.
G06K 9/00 (2022.01)
G06F 18/25 (2023.01)
(Continued)

(52) U.S. Cl.
CPC ............ *G06V 40/16* (2022.01); *G06F 18/253* (2023.01); *G06T 7/0002* (2013.01); *G06T 7/75* (2017.01);
(Continued)

(58) Field of Classification Search
None
See application file for complete search history.

(56) References Cited

U.S. PATENT DOCUMENTS

2005/0008199 A1   1/2005  Dong et al.
2016/0284123 A1*  9/2016  Hare ....................... G06T 17/20

FOREIGN PATENT DOCUMENTS

CN    101320484 A    12/2008
CN    101561874 A    10/2009
(Continued)

OTHER PUBLICATIONS

China National Intellectual Property Administration (CNIPA) Office Action 2 for 201811455877.4 dated May 7, 2022 8 Pages (including translation).

(Continued)

Primary Examiner — Wei Wen Yang
(74) Attorney, Agent, or Firm — ANOVA LAW GROUP, PLLC

(57) ABSTRACT

An image processing method and apparatus, a computer-readable medium, and an electronic device are provided. The image processing method includes: respectively projecting, according to a plurality of view angle parameters corresponding to a plurality of view angles, a face model of a target object onto a plurality of face images of the target object acquired from the plurality of view angles, to determine correspondences between regions on the face model and regions on the face image; respectively extracting, based on the correspondences and a target region in the face model that need to generate a texture image, images corresponding to the target region from the plurality of face images; and fusing the images that correspond to the target region and that are respectively extracted from the plurality of face images, to generate the texture image.

20 Claims, 11 Drawing Sheets

(51) Int. Cl.
    *G06T 7/00*     (2017.01)
    *G06T 7/73*     (2017.01)
    *G06T 11/00*     (2006.01)
    *G06T 11/60*     (2006.01)
    *G06V 40/16*     (2022.01)

(52) U.S. Cl.
    CPC ............ *G06T 11/001* (2013.01); *G06T 11/60* (2013.01); *G06V 40/161* (2022.01)

(56) References Cited

FOREIGN PATENT DOCUMENTS

| | | | | |
|---|---|---|---|---|
| CN | 106910247 A | 6/2017 | | |
| CN | 109409335 A | 3/2019 | | |
| WO | WO-2017029488 A2 * | 2/2017 | ......... | G06K 9/00248 |

OTHER PUBLICATIONS

The World Intellectual Property Organization (WIPO) International Search Report for PCT/CN2019/12193 dated Mar. 2, 2020 5 Pages (including translation).

* cited by examiner

IMAGE PROCESSING METHOD AND APPARATUS, COMPUTER-READABLE MEDIUM, AND ELECTRONIC DEVICE

CROSS-REFERENCES TO RELATED APPLICATIONS

This application is a continuation application of PCT Patent Application No. PCT/CN2019/121935, filed on Nov. 29, 2019, which claims priority to Chinese Patent Application No. 201811455877.4, entitled "IMAGE PROCESSING METHOD AND APPARATUS, COMPUTER-READABLE MEDIUM, AND ELECTRONIC DEVICE" and filed with the National Intellectual Property Administration, PRC on Nov. 30, 2018, the entire contents of both of which are incorporated herein by reference.

FIELD OF THE TECHNOLOGY

The present disclosure relates to the field of computer and communication technologies, and specifically, to an image processing method and apparatus, a computer-readable medium, and an electronic device.

BACKGROUND OF THE DISCLOSURE

Face reconstruction is a key technology and has many application scenarios in practice. For example, a character face image is reconstructed in a 3D virtual reality application, a 3D augmented reality application, or a 3D game application. The key to deciding a reconstruction effect and user experience lies in a reconstruction of a face texture image. However, a texture image obtained by using a texture image reconstruction solution provided in the related art is usually rough with relatively low accuracy.

SUMMARY

Embodiments of the present disclosure provide an image processing method and apparatus, a computer-readable medium, and an electronic device, so that the accuracy of a generated texture image can be improved to some extent.

An embodiment of the present disclosure provides an image processing method, including: respectively projecting, according to a plurality of view angle parameters corresponding to a plurality of view angles, a face model of a target object onto a plurality of face images of the target object acquired from the plurality of view angles, to determine correspondences between regions on the face model and regions on the face image; respectively extracting, based on the correspondences and a target region in the face model that need to generate a texture image, images corresponding to the target region from the plurality of face images; and fusing the images that correspond to the target region and that are respectively extracted from the plurality of face images, to generate the texture image.

An embodiment of the present disclosure further provides an image processing apparatus, including: a memory storing a program, and a processor configured to execute the program and perform a plurality of operations. The plurality of operations include: respectively projecting, according to a plurality of view angle parameters corresponding to a plurality of view angles, a face model of a target object onto a plurality of face images of the target object acquired from the plurality of view angles, to determine correspondences between regions on the face model and regions on the face image; respectively extracting, based on the correspondences and a target region in the face model that need to generate a texture image, images corresponding to the target region from the plurality of face images; and fusing the images that correspond to the target region and that are respectively extracted from the plurality of face images, to generate the texture image.

An embodiment of the present disclosure further provides a non-transitory computer-readable medium, storing a computer program, the computer program, when executed by a processor, causing the processor to perform a plurality of operations including: respectively projecting, according to a plurality of view angle parameters corresponding to a plurality of view angles, a face model of a target object onto a plurality of face images of the target object acquired from the plurality of view angles, to determine correspondences between regions on the face model and regions on the face image; respectively extracting, based on the correspondences and a target region in the face model that need to generate a texture image, images corresponding to the target region from the plurality of face images; and fusing the images that correspond to the target region and that are respectively extracted from the plurality of face images, to generate the texture image.

In the technical solutions of the embodiments of the present disclosure, by respectively projecting a face model of a target object onto a plurality of face images of the target object acquired from a plurality of view angles, to accurately determine a correspondence between a region on the face model and a region on the face image, partial image data used for generating a texture image can be accurately extracted from the face images based on the correspondence, so that the accuracy of the generated texture image is improved.

It is to be understood that the foregoing general description and the following detailed description are merely exemplary and explanatory, and cannot limit the present disclosure.

BRIEF DESCRIPTION OF THE DRAWINGS

The accompanying drawings herein, which are incorporated into the specification and constitute a part of this specification, illustrate embodiments consistent with the present disclosure and, together with the specification, serve to explain the principles of the present disclosure. Obviously, the accompanying drawings described below are only some embodiments of the present disclosure, and a person of ordinary skill in the art may further obtain other accompanying drawings according to these accompanying drawings without creative efforts. In the accompanying drawings.

DESCRIPTION OF EMBODIMENTS

At present, the exemplary implementations are described comprehensively with reference to the accompanying drawings. However, the exemplary implementations may be implemented in a plurality of forms, and are not limited to the examples described herein. On the contrary, such implementations are provided to make the present disclosure more comprehensive and complete, and fully convey the concepts of the exemplary implementations to a person skilled in the art.

In addition, the described features, structures or characteristics may be combined in one or more embodiments in any appropriate manner. In the following description, many specific details are provided to give a full understanding of the embodiments of the present disclosure. However, a person skilled in the art will realize that the technical solutions of the present disclosure can be practiced without one or more specific details, or other methods, components, apparatuses, steps and the like can be adopted. In other cases, public methods, apparatuses, implementations or operations are not shown or described in detail to avoid blurring aspects of the present disclosure.

The block diagram shown in the accompanying drawings is merely a functional entity and does not necessarily correspond to a physically independent entity. That is, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, and some operations/steps may be combined or partially combined. Therefore, an actual execution order may be changed according to the actual situation.

Figure 1:
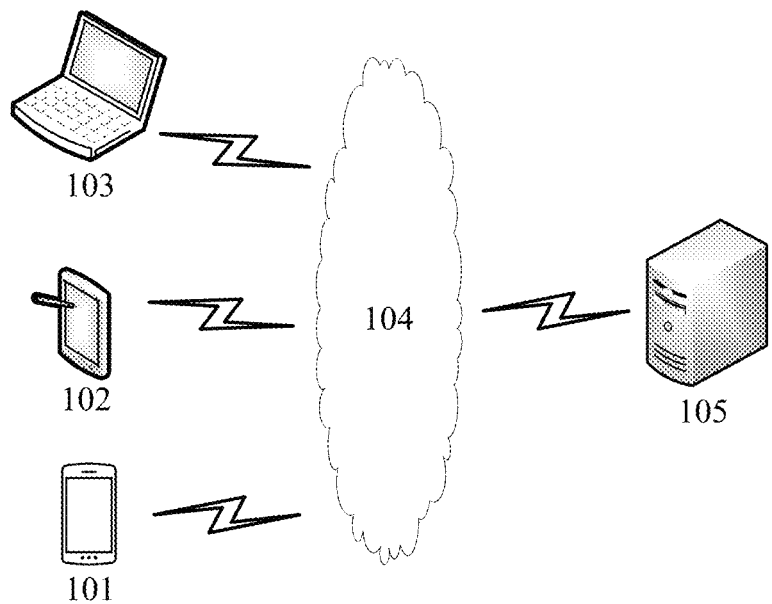
FIG. 1 is a schematic diagram of an exemplary system architecture according to the embodiments of the present disclosure may be applied.

FIG. 1 is a schematic diagram of an exemplary system architecture to which the technical solutions according to the embodiments of the present disclosure may be applied.

As shown in FIG. 1, the system architecture may include a terminal device (which may be any one or more of a smart phone 101, a tablet computer 102, and a portable computer 103 shown in FIG. 1, or certainly may be a desktop computer, and the like), a network 104, and a server 105. The network 104 is configured to provide a medium of a communication link between the terminal device and the server 105. The network 104 may include various connection types, such as, a wired communication link, a wireless communication link, and the like.

It is to be understood that the quantities of terminal devices, networks, and servers in FIG. 1 are only schematic. There may be any quantities of terminal devices, networks and servers according to an actual requirement. For example, the server 105 may be a server cluster that includes a plurality of servers.

In an embodiment of the present disclosure, the terminal device may send a face model of a target object, a plurality of face images of the target object acquired from a plurality of view angles, and a view angle parameter corresponding to each face image to the server 105 by using the network 104. The server 105 may respectively project the face model onto the plurality of face images according to the view angle parameter after the face model, the plurality of face images, and the view angle parameter are obtained, to determine correspondences between regions on the face model and regions on the face image, respectively extract, based on the correspondences and a target region in the face model that need to generate a texture image, images corresponding to the target region from the plurality of face images, and further fuse the images that correspond to the target region and that are respectively extracted from the plurality of face images, to generate the texture image of the target object.

The image processing method provided in the embodiments of the present disclosure is generally performed by the server 105, and accordingly, the image processing apparatus is generally disposed in the server 105. However, in another embodiment of the present disclosure, the terminal device may also have functions similar to those of the server, so as to perform the image processing method provided in this embodiment of the present disclosure.

Figure 2:
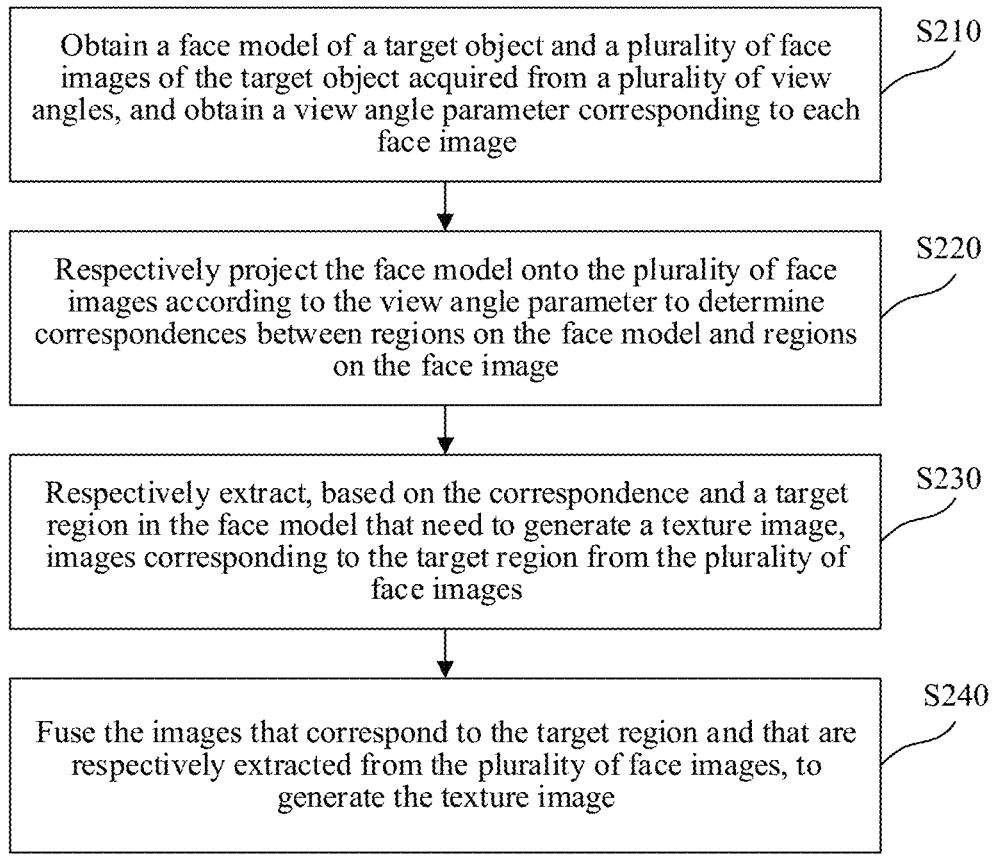
FIG. 2 is a schematic flowchart of an image processing method according to an embodiment of the present disclosure.

FIG. 2 is a schematic flowchart of an image processing method according to an embodiment of the present disclosure. The image processing method may be performed by a server, and the server may be the server shown in FIG. 1. Referring to FIG. 2, the image processing method includes at least steps S210 to S240.

Step S210. Obtain a face model of a target object and a plurality of face images of the target object acquired from a plurality of view angles, and obtain a view angle parameter corresponding to each face image.

In an embodiment of the present disclosure, the face model of the target object may be generated after a face is scanned by using a scanning device, or may be a three-dimensional face model reconstructed by using a plurality of two-dimensional face images of the target object.

The face model refers to a data set of a three-dimensional topological structure that is used for describing a face or a head including a face.

In an embodiment of the present disclosure, the plurality of face images of the target object acquired from the plurality of view angles may include a side face image (for example, a left face image or a right face image) of the target object, a front face image, and the like. The view angle parameter corresponding to the face image is a parameter acquired when a camera is used for acquiring the face image, for example, may include a rotation parameter, a translation parameter, or an orthogonal projection parameter.

Step S220. Respectively project the face model onto the plurality of face images according to the view angle parameter, to determine correspondences between regions on the face model and regions on the face image.

In an embodiment of the present disclosure, the correspondence between the region on the face model and the region on the face image may be a correspondence between points on the face model and points on the face image, or may be a correspondence between a line segment/closed shape (such as a triangle) on the face model and a line segment/closed shape on the face image.

Figure 3:
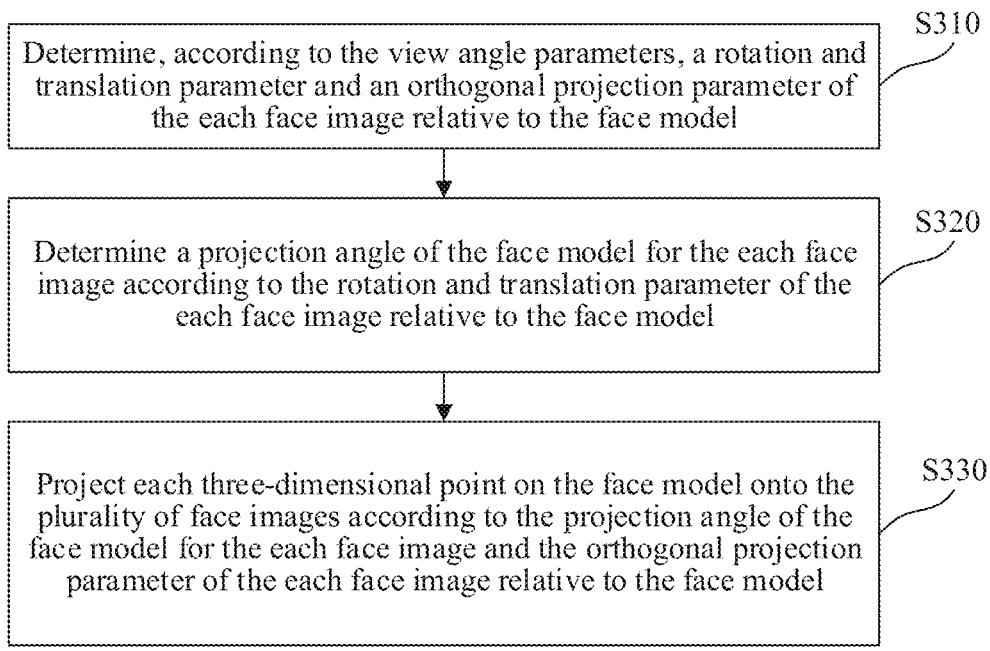
FIG. 3 is a schematic flowchart of respectively projecting a face model onto a plurality of face images according to view angle parameters according to an embodiment of the present disclosure.

In an embodiment of the present disclosure, as shown in FIG. 3, a process of respectively projecting the face model onto the plurality of face images according to the view angle parameter in step S220 may specifically include the following steps.

Step S310. Determine, according to the view angle parameter, a rotation and translation parameter and an orthogonal projection parameter of the each face image relative to the face model.

Step S320. Determine a projection angle of the face model for the each face image according to the rotation and translation parameter of the each face image relative to the face model.

In an embodiment of the present disclosure, the face model is a three-dimensional model. Therefore, a projection angle of the face model may be adjusted according to the rotation and translation parameter of the each face image relative to the face model. For example, the face model may be adjusted towards an orientation the same as that of the face image by adjusting the projection angle of the face model, and then the face model is projected onto the each face image.

Step S330. Project each three-dimensional point on the face model onto the plurality of face images according to the projection angle of the face model for the each face image and the orthogonal projection parameter of the each face image relative to the face model.

In an embodiment of the present disclosure, after the each three-dimensional point on the face model is projected onto the face images, a position at which a three-dimensional point on the face model is projected onto the each face image is determined. For a first position in the face images which only one three-dimensional point is projected onto, the three-dimensional point projected at the first position is used as a three-dimensional point corresponding to the first position, and for a second position in the face images which the plurality of three-dimensional points are projected onto, a three-dimensional point having the least depth in the plurality of three-dimensional points is used as a three-dimensional point corresponding to the second position, so as to resolve a problem of overlapping of three-dimensional points having different depth information after the projection.

Still refer to FIG. 2. Step S230. Respectively extract, based on the correspondences and a target region in the face model that need to generate a texture image, images corresponding to the target region from the plurality of face images.

In an embodiment of the present disclosure, the target region in step S230 may be determined through the following process: splitting a designated three-dimensional face model according to a designated cutting line, spreading the three-dimensional face model along the cutting line to obtain a two-dimensional face image, and selecting a designated region from the two-dimensional face image as the target region. The designated three-dimensional face model may be the face model of the target object, or may be another face model having a same topological structure as the face model of the target object.

Figure 4:
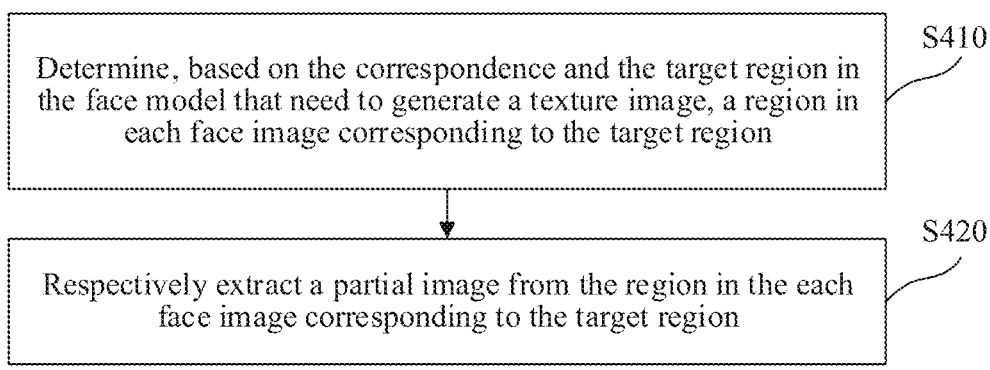
FIG. 4 is a schematic flowchart of extracting an image associated with a target region from a plurality of face images according to an embodiment of the present disclosure.

In an embodiment of the present disclosure, as shown in FIG. 4, the process of respectively extracting images corresponding to the target region from the plurality of face images in step S230 may include the following steps.

Step S410. Determine, based on the correspondences and the target region in the face model that need to generate a texture image, a region in each face image corresponding to the target region.

In an embodiment of the present disclosure, there is a correspondence between points on the face model and points on the face image. Therefore, the region in the each face image corresponding to the target region may be determined according to the target region in the face model.

Step S420. Respectively extract a partial image from the region in the each face image corresponding to the target region.

In an embodiment of the present disclosure, a face orientation included in the each face image may be determined according to a view angle parameter corresponding to the each face image, then an image that needs to be extracted from the region in the each face image corresponding to the target region is determined according to the face orientation included in the each face image, and the partial image is further extracted from the each face image according to the image that needs to be extracted from the region in the each face image corresponding to the target region.

Still refer to FIG. 2. Step S240. Fuse the images that correspond to the target region and that are respectively extracted from the plurality of face images, to generate the texture image.

In an embodiment of the present disclosure, the extracted images corresponding to the target region may be fused by using a Laplacian pyramid fusion algorithm or a Poisson fusion algorithm.

According to the technical solutions of the foregoing embodiments of the present disclosure, a correspondence between the region on the face model (for example, the points on the face model) and the region on the face image (for example, the points on the face image) can be accurately obtained through projections of the face model onto the plurality of face images acquired from the plurality of view angles, and partial images used for generating the texture image can be accurately extracted from the face images based on the correspondence, so that the accuracy of the generated texture image is improved.

Figure 5:
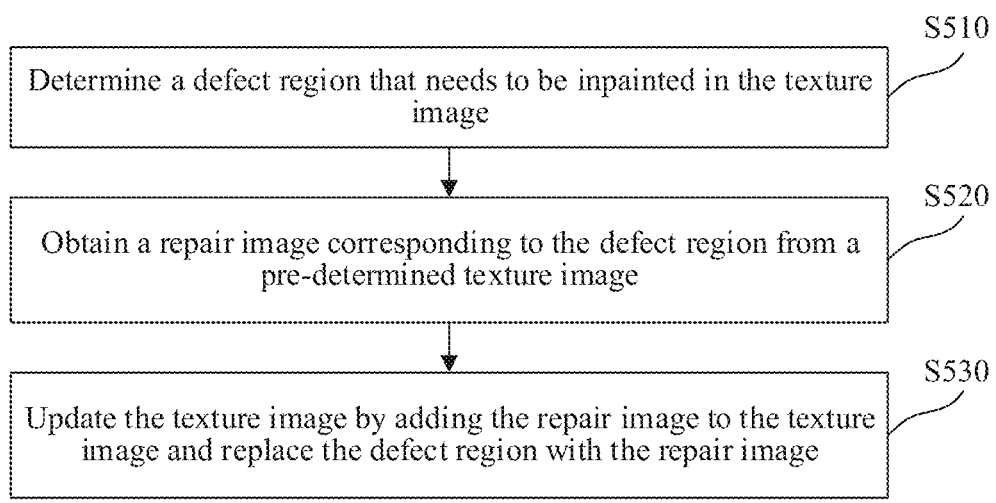
FIG. 5 is a schematic flowchart of an image processing method according to an embodiment of the present disclosure.

Based on the technical solution of generating the texture image in the foregoing embodiments, as shown in FIG. 5, the image processing method according to an embodiment of the present disclosure includes the following steps.

Step S510. Determine a defect region that needs to be repaired in the texture image.

In an embodiment of the present disclosure, the defect region that needs to be repaired in the texture image may be a region in which a problem occurs during image fusion, for example, because a defect may occur in a fusion process of a nostril region and/or a lip region in the texture image, the nostril region and/or the lip region in the texture image may be used as a defect region that needs to be repaired.

Step S520. Obtain an repaired image corresponding to the defect region from a pre-determined texture image.

In an embodiment of the present disclosure, the pre-determined texture image may be a standard texture image template, and the repaired image corresponding to the defect region is used for updating the defect region. For example, if the defect region is a nostril region, a nostril image may be obtained from the pre-determined texture image to repair the defect region.

Step S530. Repair the texture image by adding the repaired image to the texture image and replace the defect region with the repaired image.

In an embodiment of the present disclosure, a color of the repaired image may be adjusted according to a color of the defect region. For example, if the defect region is a lip region, after a lip image is obtained from the pre-determined texture image, a color of the obtained lip image may be set according to a lip color in the defect region. The color of the repaired image may be adjusted after the repaired image is added to the texture image, or may be adjusted before the repaired image is added to the texture image.

Figure 6:
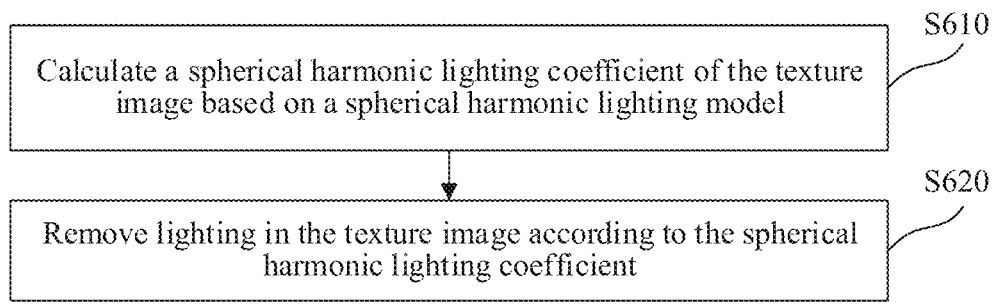
FIG. 6 is a schematic flowchart of an image processing method according to an embodiment of the present disclosure.

Based on the technical solution of generating the texture image in the foregoing embodiments, as shown in FIG. 6, the image processing method according to an embodiment of the present disclosure includes the following steps.

Step S610. Calculate a spherical harmonic lighting coefficient of the texture image based on a spherical harmonic lighting model.

Step S620. Remove lighting in the texture image according to the spherical harmonic lighting coefficient.

The lighting in the texture image can be removed by using the technical solution of the embodiment shown in FIG. 6, so that lighting can be added when the face model is subsequently rendered through the texture image, and a better effect after the face model is rendered is ensured.

Figure 7:
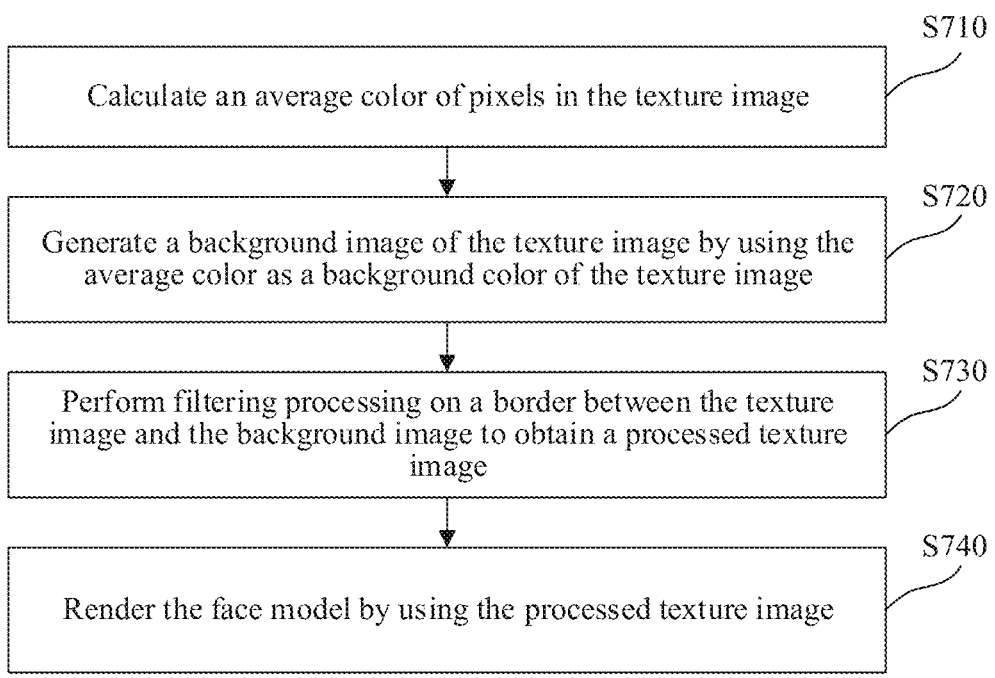
FIG. 7 is a schematic flowchart of an image processing method according to an embodiment of the present disclosure.

Based on the technical solution of generating the texture image in the foregoing embodiments, as shown in FIG. 7, the image processing method according to an embodiment of the present disclosure includes the following steps.

Step S710. Calculate an average color of pixels in the texture image.

Step S720. Generate a background image of the texture image by using the average color as a background color of the texture image.

In an embodiment of the present disclosure, the texture image may be added to the background image for fusion. For example, the texture image and the background image are fused by using a Laplacian pyramid fusion algorithm or a Poisson fusion algorithm.

Step S730. Perform filtering processing on a border between the texture image and the background image to obtain a processed texture image.

In an embodiment of the present disclosure, filtering processing may be performed on the border between the texture image and the background image by using a Gaussian filter.

Step S740. Render the face model by using the processed texture image.

The texture image may be post-processed by using the technical solution of the embodiment shown in FIG. 7, thereby improving a rendering effect of the texture image on the face model.

The following describes in detail the technical solutions of the embodiments of the present disclosure with reference to FIG. 8 to FIG. 19 by using the acquisition of three face images of the target object as an example.

Figure 8:
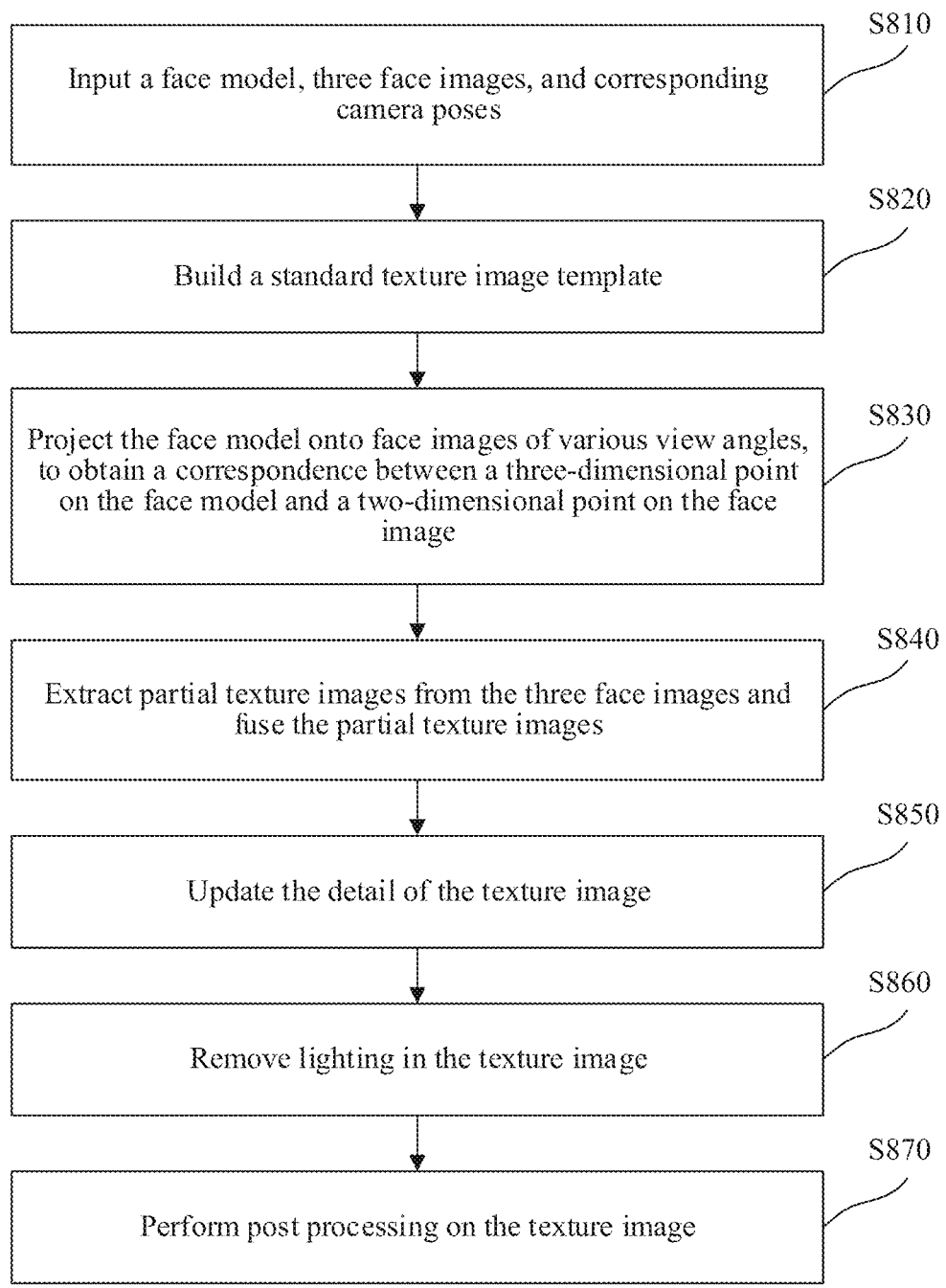
FIG. 8 is a schematic flowchart of an image processing method according to an embodiment of the present disclosure.

As shown in FIG. 8, an image processing method according to an embodiment of the present disclosure includes the following step S810 to step S870, and is described in the following in detail.

Step S810. Input a face model, three face images, and corresponding camera poses.

Figure 9:
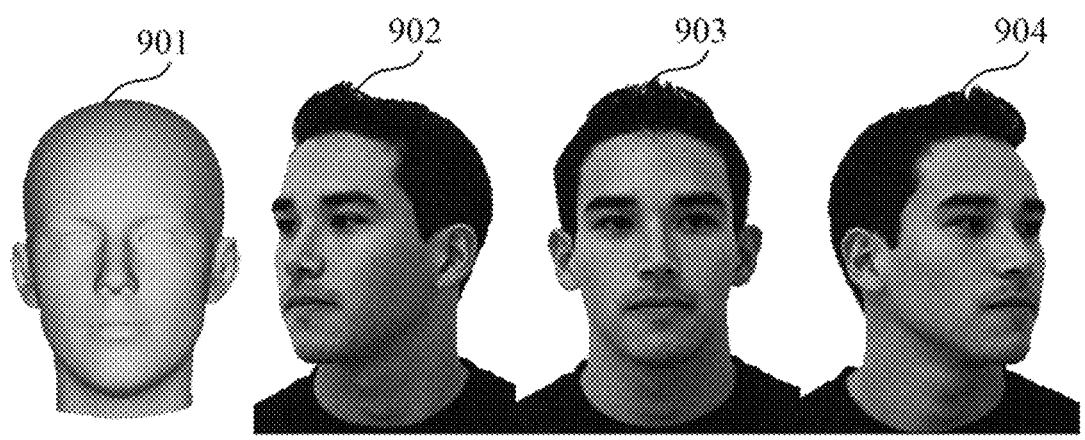
FIG. 9 is a schematic diagram of a face model and a face image according to an embodiment of the present disclosure.

In an embodiment of the present disclosure, as shown in FIG. 9, 901 represents the inputted face model, and 902, 903, and 904 represent the three face images. The face model 901 may be a three-dimensional model reconstructed based on the face images 902, 903, and 904, or may be a three-dimensional model obtained by scanning a face.

In an embodiment of the present disclosure, the camera poses corresponding to the face images 902, 903, and 904 are view angle parameters of the face images. For example, the view angle parameter may include a rotation parameter, a translation parameter, an orthogonal projection parameter, and the like.

Step S820. Build a standard texture image template.

Figure 10:
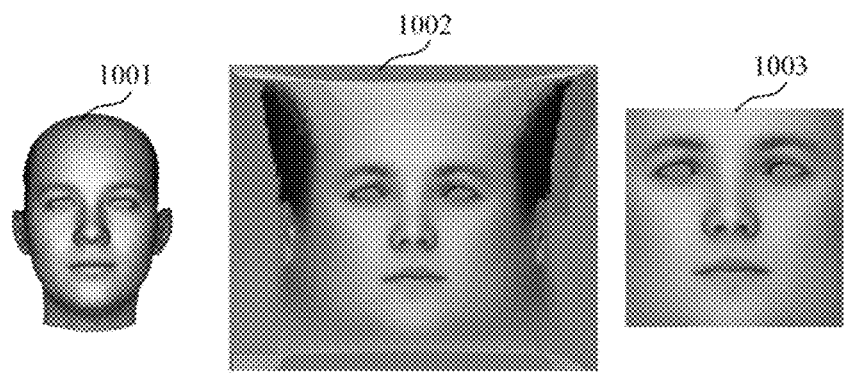
FIG. 10 is a schematic diagram of a texture image template obtained by processing a face model according to an embodiment of the present disclosure.

In an embodiment of the present disclosure, as shown in FIG. 10, a face model 1001 (the face model may be a mesh model) with a given topological structure may be split from the back of the head along a cutting line (for example, a cutting line in a vertical direction), and then taken as a cylinder, the face model 1001 is spread. Each column scales to the same length to obtain a two-dimensional image 1002. A middle portion of the two-dimensional image 1002 is extracted and used as a uvmap (texture image) template 1003, corresponding portions may be further extracted from the face images 902, 903, and 904 to fill in the uvmap template, and a face texture image is generated.

Step S830. Project the face model onto face images of various view angles, to obtain a correspondence between a three-dimensional point on the face model and a two-dimensional point on the face image.

In an embodiment of the present disclosure, the face model 901, rotation and translation parameters, and orthogonal projection parameters of the face images 902, 903, and 904 relative to the face model are obtained in step S810. Therefore, three-dimensional points on the reconstructed three-dimensional model may be projected onto the face images 902, 903, and 904 with reference to the following Formula 1.

$$x = \begin{bmatrix} f & 0 & 0 \\ 0 & f & 0 \end{bmatrix} \times X \qquad \text{Formula 1}$$

In the Formula 1, a two-dimensional point x=[u,v], a three-dimensional point X=[x, y, z], and f represents an orthogonal projection parameter. The reconstructed face model may be projected onto each two-dimensional face image by using the foregoing Formula 1.

In an embodiment of the present disclosure, in the process of projecting a point on a three-dimensional model onto a two-dimensional face image, whether a shielding case occurs may be determined according to depth information of the point on the three-dimensional model, so that a point close to a camera is ensured to be a point that is finally projected onto. Specifically, in the process of projecting the three-dimensional point on the face model onto the face image, a position at which each triangle on the face model is projected onto the two-dimensional image is recorded, and depth information about the three-dimensional point at the position is also recorded. If depth information at a certain position is recorded, and there is another three-dimensional point projected at the position, a three-dimensional point having the least depth is selected as a point corresponding to the position.

Figure 11:
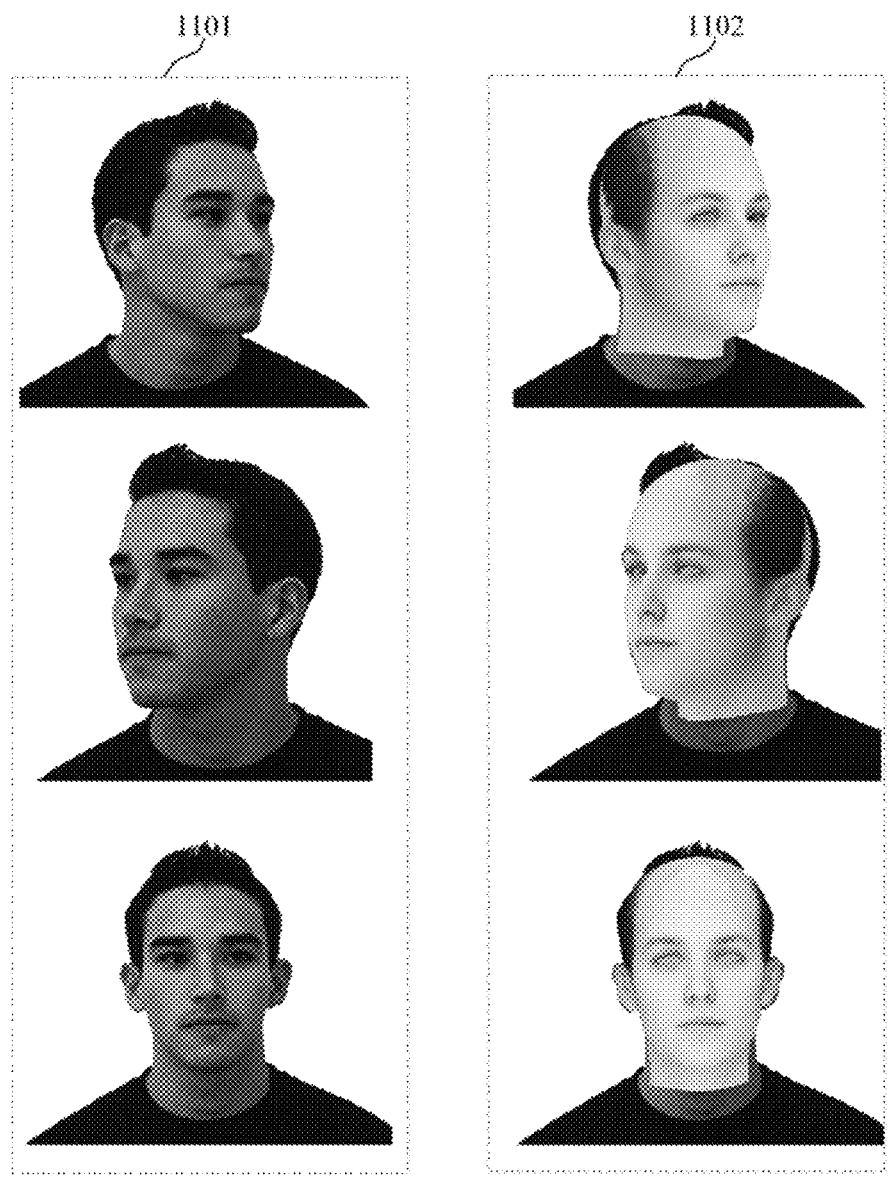
FIG. 11 is a schematic diagram showing an exemplary result of projecting a face model onto a face image according to an embodiment of the present disclosure.

A specific projection effect is shown in FIG. 11. 1101 in FIG. 11 shows face images before being projected, and 1102 is a schematic diagram showing an exemplary result of projecting a face model onto the face images. It can be seen from FIG. 11 that if the face model is accurately reconstructed, a position corresponding to each point on the face model may be found on the two-dimensional face image, and the correspondence may be recorded, so that a texture image is extracted from the two-dimensional face image according to the correspondence.

Step S840. Extract partial texture images from the three face images and fuse the partial texture images.

Figure 12:
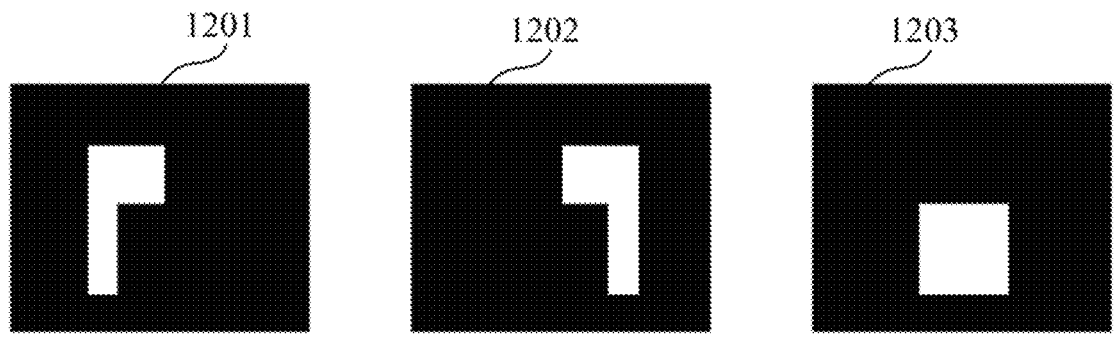
FIG. 12 is a schematic diagram of a mask region set according to an embodiment of the present disclosure.
Figure 13:
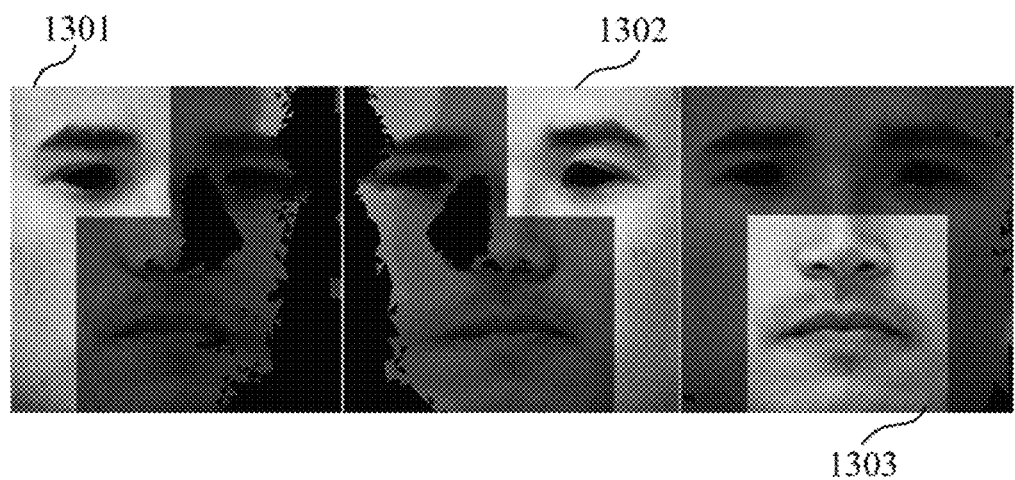
FIG. 13 is a schematic diagram of a partial image obtained by using a mask region according to an embodiment of the present disclosure.

In an embodiment of the present disclosure, as shown in FIG. 9 and FIG. 12, the selected three face images are a left face image, a front face image, and a right face image, and camera poses corresponding to the images are obtained. Therefore, the left face image, the front face image, and the right face image may be determined according to the camera poses corresponding to the images, and mask regions 1201, 1202, and 1203 respectively corresponding to the right face image, the left face image, and the front face image are preset accordingly. Further, partial regions that are not shielded are obtained respectively from the three face images based on the mask regions 1201, 1202, and 1203. The specific obtained partial regions are shown as 1301, 1302, and 1303 in FIG. 13.

In an embodiment of the present disclosure, after being extracted from the three face images through the mask regions, the partial regions may be fused to obtain a fusion image (that is, the texture image that needs to be extracted). To ensure that an image border transits naturally during fusion, a Laplacian pyramid fusion algorithm may be used for the fusion, or a Poisson fusion algorithm is used for the fusion. A specific fusion effect is shown in FIG. 14.

Step S850. Update the detail of the texture image.

Figure 14:
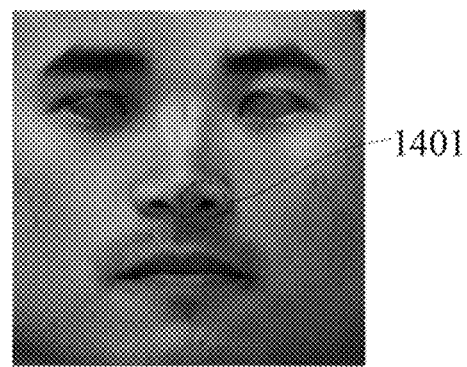
FIG. 14 is a schematic diagram showing an exemplary result of extracted images after being fused according to an embodiment of the present disclosure.
Figure 15:
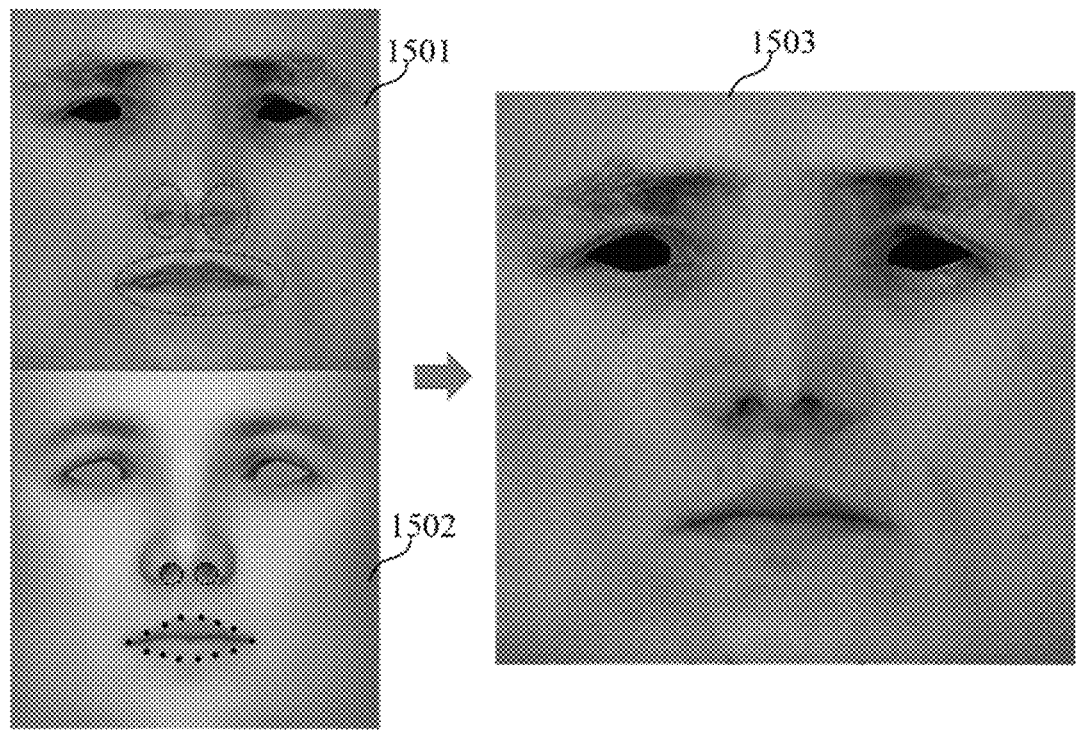
FIG. 15 is a schematic diagram showing an exemplary comparison result before and after updating the detail of a fused image according to an embodiment of the present disclosure.

In an embodiment of the present disclosure, after the image fusion processing, a problem of an unreasonable display of partial detail, for example, a nostril part 1401 shown in FIG. 14, may occur. The reason for the problem may be that the part is inside the nostril and cannot be extracted from an original image, or may be that the generated face model is not accurate, and the part corresponding to a region on the original image is not accurate, and therefore, a texture image at a wrong position is extracted. In addition to the nostril part, a similar case may occur in another part (for example, a mouth), for example, a nostril region and a mouth region in a fusion image 1501 shown in FIG. 15 are unreasonably displayed. For such a problem, the processing solution in this embodiment of the present disclosure is to extract a partial image corresponding to a faulty region from a standard uvmap (for example, a standard uvmap image 1502 shown in FIG. 15), then adjust a color of the partial image to be a color the same as that of the faulty region, and replace the faulty region on the fusion image with the partial image. A final effect is shown as an image 1503 in FIG. 15.

Figure 16:
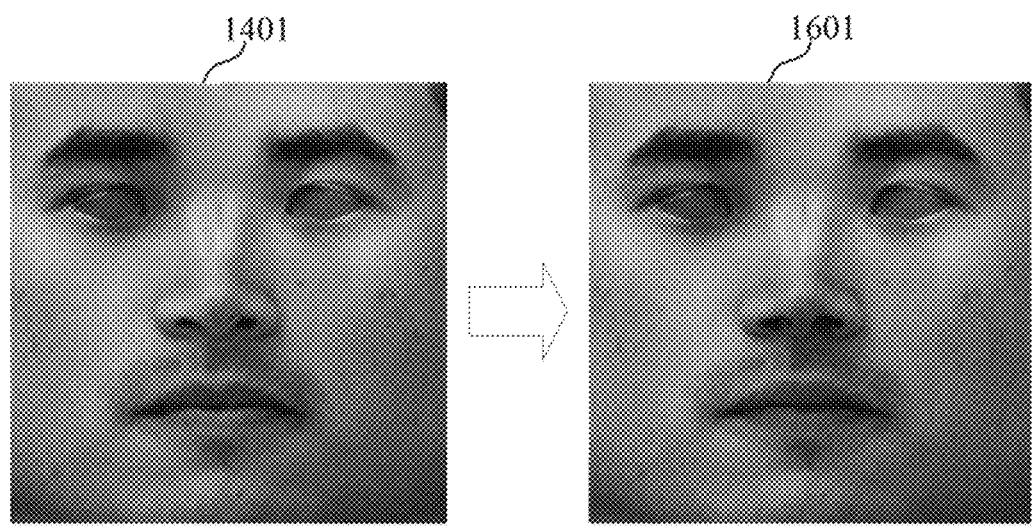
FIG. 16 is a schematic diagram showing an exemplary comparison result before and after updating the detail of a fused image shown in FIG. 14 according to an embodiment of the present disclosure.

The fusion image 1401 shown in FIG. 14 is processed in the foregoing processing manner, and an obtained processed image is shown as 1601 in FIG. 16, thereby resolving an unreasonable display in the fusion image and repairing the detail of the fusion image.

Step S860. Remove lighting in the texture image.

In an embodiment of the present disclosure, the lighting in the texture image obtained through the technical solution of the foregoing embodiment may be uniform, and an unreasonable display may occur if lighting is added during a later rendering. For example, there is an obvious reflection of light in a region 1602 in an image 1601 shown in FIG. 17. To remove the lighting in the image 1601, a 3-order spherical harmonic lighting model may be used in this embodiment of this present disclosure to simulate the lighting. A specific formula is shown as the following Formula 2:

$$\text{color} = \text{albedo} \times (H \times \text{light}) \quad \text{Formula 2}$$

where color represents a color with lighting in the texture image (which may be an n*3 matrix, 3 representing three RGB channels, and n representing length*width of the texture image), albedo represents a target lighting-removed image (which may be an n*3 matrix, 3 representing three RGB channels) finally obtained, H represents a spherical harmonic basis (which may be an n*9 matrix), and light represents a spherical harmonic lighting coefficient (which may be a 9*3 matrix).

In an embodiment of the present disclosure, the spherical harmonic basis H includes 9 spherical harmonic basis functions. When $n_x$, $n_y$, $n_z$ is used for representing a normal direction, the 9 spherical harmonic basis functions are respectively shown in the following Formula 3.

$$h_1 = \frac{1}{\sqrt{4\pi}}, h_2 = \sqrt{\frac{3}{4\pi}} n_2, h_3 = \sqrt{\frac{3}{4\pi}} n_x, \quad \text{Formula 3}$$

$$h_4 = \frac{1}{\sqrt{4\pi}} n_y, h_5 = \frac{1}{2}\sqrt{\frac{5}{4\pi}} (3n_z^2 - 1)$$

$$h_6 = 3\sqrt{\frac{5}{12\pi}} n_x n_z, h_7 = 3\sqrt{\frac{5}{12\pi}} n_y n_z,$$

$$h_8 = \frac{3}{2}\sqrt{\frac{5}{12\pi}} (n_x^2 - n_y^2), h_9 = 3\sqrt{\frac{5}{12\pi}} n_x n_y$$

It can be seen from the foregoing Formula 3 that the spherical harmonic basis function depends on the normal direction.

In an embodiment of the present disclosure, in a process of resolving albedo, albedo is initialized as an average color first, and then light is calculated, and albedo is resolved through the light in reverse. A plurality of iterations are performed until convergence occurs. A specific process may be as follows:

albedo is initialized as an average color $\rho^0$, then $\rho^0$ is substituted into the foregoing Formula 2, and an initial spherical harmonic lighting coefficient $L^0$ is obtained by using a least square method. The spherical harmonic lighting coefficient $L^0$ is substituted into the foregoing Formula 2 to resolve and obtain a new $\rho^1$. Then a spherical harmonic lighting coefficient $L^1$ is estimated by using the least square method again. The rest is deduced by analogy. albedo can be obtained when convergence occurs after a plurality of iterations (for example, 5 iterations).

Figure 17:
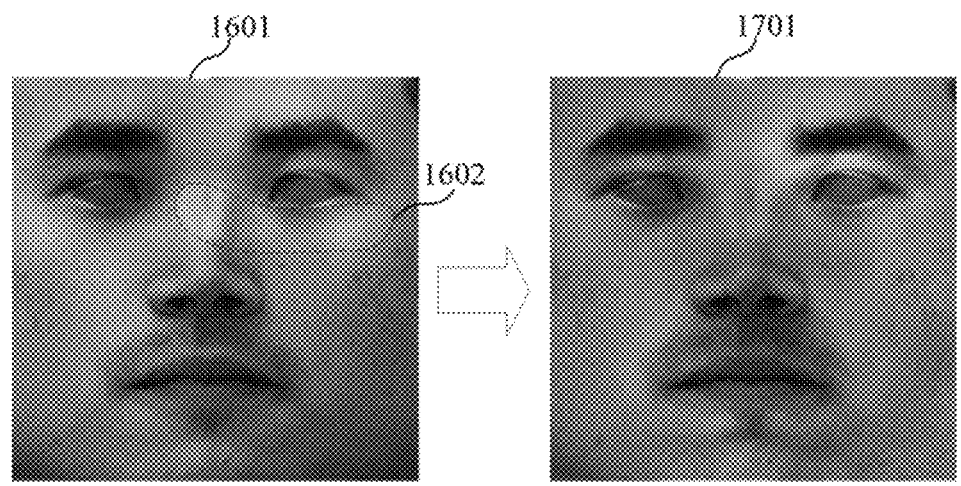
FIG. 17 is a schematic diagram showing an exemplary comparison result before and after removing lighting in an image according to an embodiment of the present disclosure.

A processing result finally obtained through the foregoing processing manner is shown as 1701 in FIG. 17. It can be seen that a color of the processed image is obviously more uniform.

Step S870. Perform post processing on the texture image.

Figure 18:
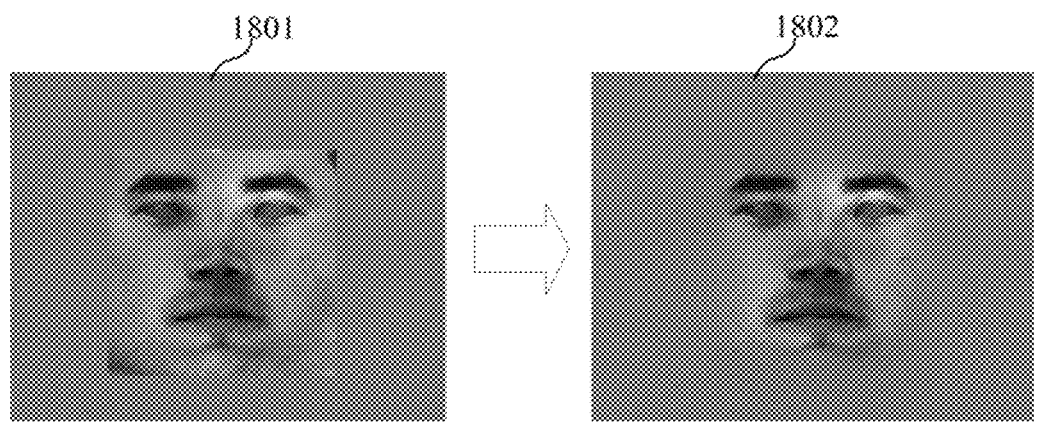
FIG. 18 is a schematic diagram showing an exemplary comparison result before and after fusing and filtering processing performed on a texture image and a background image according to an embodiment of the present disclosure.

In an embodiment of the present disclosure, after the texture image is processed, a background color may be set as the average color of the image, because the texture image in this embodiment of the present disclosure does not need hair. To ensure that there is no obvious border in a fusion image of the background image and the texture image, and interference factors in the texture image, for example, hair and hair on temples are filtered, large Gaussian filtering may be performed on edges of the background image and the texture image for smoothing, and the background image and the texture image are fused by using a Laplacian pyramid fusion algorithm or a Poisson fusion algorithm. A specific processing effect is shown in FIG. 18. An image 1801 is an image before fusing and filtering processing are performed on the texture image and the background image, and an image 1802 is an image after fusing and filtering processing are performed on the texture image and the background image.

Figure 19:
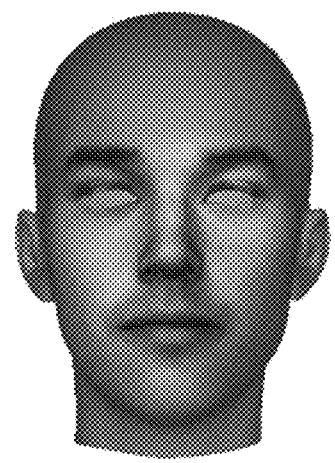
FIG. 19 is a schematic diagram showing an exemplary result of a face model rendered by using a texture image according to an embodiment of the present disclosure.

In an embodiment of the present disclosure, when the processed texture image is obtained, the face model 901 shown in FIG. 9 may be rendered through the texture image, and a finally obtained rendering effect is shown in FIG. 19.

The technical solutions of the embodiments of the present disclosure are described in detail in FIG. 8 to FIG. 19 by using an example in which three face images of the target object are acquired. In another embodiment of the present disclosure, more face images may be acquired for processing.

The following describes apparatus embodiments of the present disclosure, and the apparatus embodiments can be used for performing the image processing method in the foregoing embodiments of the present disclosure. For details not disclosed in the apparatus embodiments of the present disclosure, refer to the foregoing embodiment of the image processing method of the present disclosure.

Figure 20:
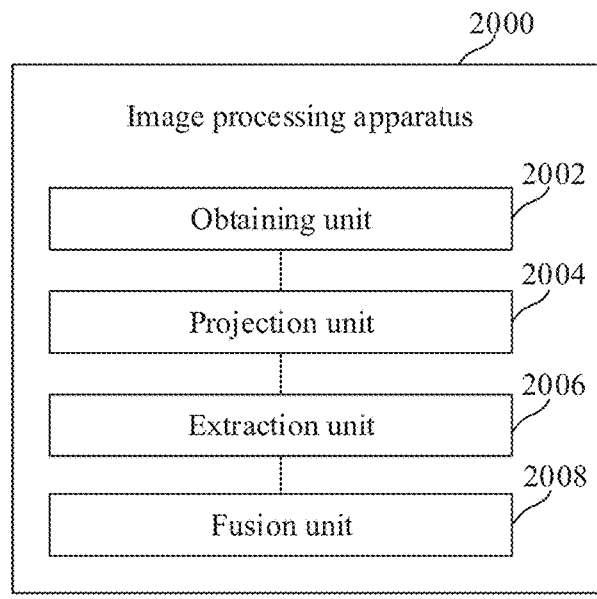
FIG. 20 is a schematic block diagram of an image processing apparatus according to an embodiment of the present disclosure.

FIG. 20 is a schematic block diagram of an image processing apparatus according to an embodiment of the present disclosure.

Referring to FIG. 20, an image processing apparatus 2000 according to an embodiment of the present disclosure includes: an obtaining unit 2002, a projection unit 2004, an extraction unit 2006 and a fusion unit 2008.

The obtaining unit 2002 is configured to obtain a face model of a target object and a plurality of face images of the target object acquired from a plurality of view angles, and obtain a view angle parameter corresponding to each face image. The projection unit 2004 is configured to respectively project the face model onto the plurality of face images according to the view angle parameter, to determine a correspondence between a region on the face model and a region on the face image. The extraction unit 2006 is configured to respectively extract, based on the correspondences and a target region in the face model that need to generate a texture image, images corresponding to the target region from the plurality of face images. The fusion unit 2008 is configured to fuse the images that correspond to the target region and that are respectively extracted from the plurality of face images, to generate the texture image.

In an embodiment of the present disclosure, the projection unit 2004 is configured to: determine, according to the view angle parameter, a rotation and translation parameter and an orthogonal projection parameter of the each face image relative to the face model; determine a projection angle of the face model for the each face image according to the rotation and translation parameter of the each face image relative to the face model; and project each three-dimensional point on the face model onto the plurality of face images according to the projection angle of the face model for the each face image and the orthogonal projection parameter of the each face image relative to the face model.

In an embodiment of the present disclosure, the projection unit 2004 is configured to: determine a position at which the three-dimensional point on the face model is projected on the each face image; use, for a first position at which only one three-dimensional point is projected on the each face image, the three-dimensional point projected at the first position as a three-dimensional point corresponding to the first position; and use, for a second position at which a plurality of three-dimensional points are projected on the each face image, a three-dimensional point having the least depth in the plurality of three-dimensional points as a three-dimensional point corresponding to the second position.

In an embodiment of the present disclosure, the extraction unit 2006 is configured to: determine, based on the correspondences and the target region in the face model that need to generate a texture image, a region corresponding to the target region in the each face image; and extract a partial image from a region in the each face image corresponding to the target region.

In an embodiment of the present disclosure, the extraction unit 2006 is configured to: determine, according to the view angle parameter corresponding to the each face image, a face orientation included in the each face image; determine, according to the face orientation included in the each face image, an image that needs to be extracted from the region in the each face image corresponding to the target region; and extract the partial image from the each face image according to the image that needs to be extracted from the region in the each face image corresponding to the target region.

In an embodiment of the present disclosure, the fusion unit 2008 is configured to: fuse the extracted images corresponding to the target region by using a Laplacian pyramid fusion algorithm or a Poisson blending algorithm.

In an embodiment of the present disclosure, the image processing apparatus 2000 further includes: a repair unit, configured to determine a defect region that needs to be repaired in the texture image; obtain a repaired image corresponding to the defect region from a pre-determined texture image; and update the texture image by adding the repaired image to the texture image and replacing the defect region with the repaired image.

In an embodiment of the present disclosure, the repair unit is further configured to adjust a color of the repaired image according to a color of the defect region.

In an embodiment of the present disclosure, the repair unit is configured to: detect a nostril region and/or a lip region in the texture image; and use the nostril region and/or the lip region as the defect region.

In an embodiment of the present disclosure, the image processing apparatus 2000 further includes: a lighting removal unit, configured to calculate a Spherical harmonic lighting coefficient of the texture image based on a Spherical harmonic lighting model; and remove lighting in the texture image according to the Spherical harmonic lighting coefficient.

In an embodiment of the present disclosure, an image processing apparatus 2000 further includes: a rendering processing unit, configured to calculate an average color of pixels in the texture image; generate a background image of the texture image by using the average color as a background color of the texture image; perform filtering processing on a border between the texture image and the background image to obtain a processed texture image; and render the face model by using the processed texture image.

In an embodiment of the present disclosure, the image processing apparatus 2000 further includes: a target region determining unit, configured to split a designated three-dimensional face model according to a designated cutting line, spread the three-dimensional face model along the cutting line to obtain a two-dimensional face image, and select a designated region from the two-dimensional face image as the target region.

Each module/unit and/or submodule/subunit in various disclosed embodiments can be integrated in a processing unit, or each module/unit and/or submodule/subunit can exist separately and physically, or two or more modules/units and/or submodule/subunit can be integrated in one unit. The modules/units and/or submodule/subunit as disclosed herein can be implemented in the form of hardware (e.g., processing circuitry and/or memory) or in the form of software functional unit(s) (e.g., developed using one or more computer programming languages), or a combination of hardware and software.

Figure 21:
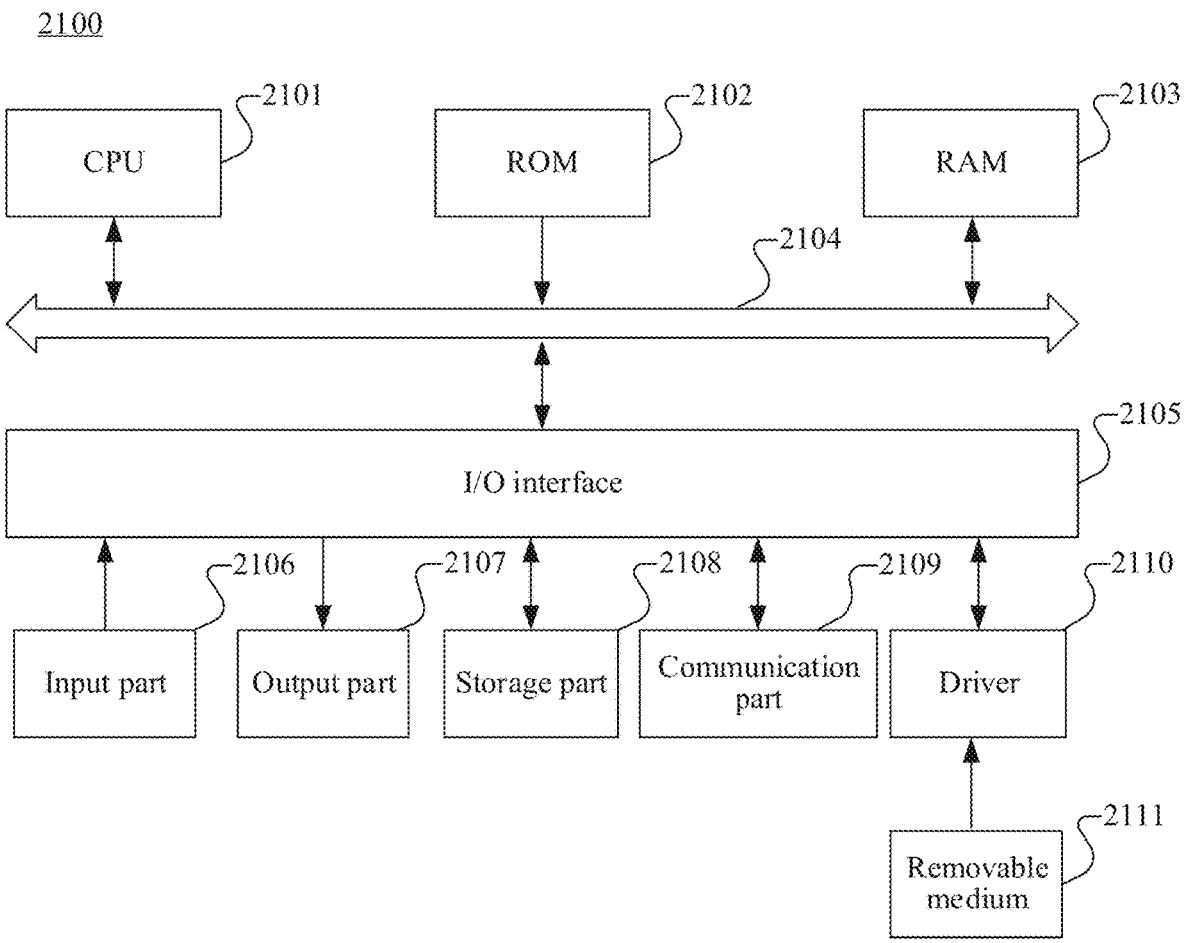
FIG. 21 is a schematic structural diagram of a computer system adapted to implement an electronic device according to an embodiment of the present disclosure.

FIG. 21 is a schematic structural diagram of a computer system adapted to implement an electronic device according to an embodiment of the present disclosure.

A computer system 2100 of the electronic device shown in FIG. 21 is merely an example, and does not constitute any limitation on functions and use ranges of the embodiments of the present disclosure.

As shown in FIG. 21, the computer system 2100 includes a central processing unit (CPU) 2101, which may perform various proper actions and processing based on a program stored in a read-only memory (ROM) 2102 or a program loaded from a storage part 2108 into a random access memory (RAM) 2103. The RAM 2103 further stores various programs and data required for system operations. The CPU 2101, the ROM 2102, and the RAM 2103 are connected to each other through a bus 2104. An input/output (I/O) interface 2105 is also connected to the bus 2104.

The following components are connected to the I/O interface 2105: an input part 2106 including a keyboard, a mouse, or the like, an output part 2107 including a cathode ray tube (CRT), a liquid crystal display (LCD), a speaker, or the like, a storage part 2108 including a hard disk, or the like, and a communication part 2109 including a network interface card such as a local area network (LAN) card or a modem. The communication part 2109 performs communication processing through a network such as the Internet. A driver 2110 is also connected to the I/O interface 2105 as required. A removable medium 2111 such as a magnetic disk, an optical disc, a magneto-optical disk, or a semiconductor memory is installed on the driver 2110 as required, so that a computer program read from the removable medium 2111 is installed into the storage part 2108 as required.

Particularly, according to an embodiment of the present disclosure, the processes described in the following with reference to the flowcharts may be implemented as computer software programs. For example, an embodiment of the present disclosure includes a computer program product, including a computer program carried on a computer-readable medium. The computer program includes program code for performing the method shown in the flowchart. In such an embodiment, the computer program may be downloaded and installed through the communication part 2109 from a network, and/or installed from the removable medium 2111. When the computer program is executed by the CPU 2101, the various functions defined in the system of this application are executed.

The computer-readable medium shown in the embodiments of the present disclosure may be a computer-readable signal medium or a computer-readable storage medium or any combination of two. The computer-readable storage medium may be, for example, but not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, the computer-readable signal medium may include a data signal being in a baseband or propagated as at least a part of a carrier wave, and carries computer-readable program code. The propagated data signal may be in a plurality of forms, including but not limited to, an electromagnetic signal, an optical signal, or any appropriate combination thereof. The computer-readable signal medium may be further any computer-readable medium in addition to the computer-readable storage medium. The computer-readable medium may send, propagate, or transmit a program configured to be used by or in combination with an instruction execution system, an apparatus, or a device. The program code included in the computer-readable medium may be transmitted by using any suitable medium, including but not limited to: a wireless medium, a wired medium, or the like, or any suitable combination of the above.

The flowcharts and block diagrams in the accompanying drawings show architectures, functions, and operations that may be implemented for the system, the method, and the computer program product according to the embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

The involved units described in the embodiments of the present disclosure may be implemented in software or hardware, and the described units may also be disposed in a processor. Names of the units do not constitute a limitation on the units under certain circumstances.

According to another aspect, the present disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of the present disclosure, features and functions of the two or more modules or units described above may be embodied in one module or unit. Conversely, the features and functions of one module or unit described above may be further divided into a plurality of modules or units to be embodied.

Through the descriptions of the foregoing implementations, a person skilled in the art easily understands that the exemplary implementations described herein may be implemented through software, or may be implemented through software in combination with necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the implementations of the present disclosure.

A person skilled in the art upon consideration of the specification and practice of the present disclosure disclosed herein will readily appreciate other implementations of the present disclosure. The present disclosure is intended to cover any variations, uses, or adaptations of the present disclosure, and the variations, uses, and adaptations follow a general principle of the present disclosure and include common sense or common technical means in this technical field that are not disclosed in the present disclosure.

The present disclosure is not limited to the precise structures described above and shown in the accompanying drawings, and various modifications and changes can be made without departing from the scope of the present disclosure. The scope of the present disclosure is limited only by the appended claims.

What is claimed is:

1. An image processing method, comprising:
respectively projecting, according to a plurality of view angle parameters corresponding to a plurality of view angles, a face model of a target object onto a plurality of face images of the target object acquired from the plurality of view angles, to determine correspondences between regions on the face model and regions on the face image, the face model having a given topological structure;
building a two-dimensional (2D) texture image template according to the face model;
respectively extracting, based on the correspondences and target regions in the face model that need to generate a texture image, partial texture images corresponding to the target regions from the plurality of face images, wherein each partial texture image represents texture of a connected pixel region on a face depicted by the plurality of face images; and
fusing, according to the 2D texture image template, the partial texture images that correspond to the target regions and that are respectively extracted from the plurality of face images, to generate the texture image, the texture image being a 2D image.

2. The image processing method according to claim 1, wherein the respectively projecting, according to a plurality of view angle parameters corresponding to a plurality of view angles, a face model of a target object onto a plurality of face images of the target object acquired from the plurality of view angles comprises:
determining, according to the view angle parameters, a rotation and translation parameter and an orthogonal projection parameter of each face image relative to the face model;
determining a projection angle of the face model for the each face image according to the rotation and translation parameter of the each face image relative to the face model; and
projecting each three-dimensional point on the face model onto the plurality of face images according to the projection angle of the face model for the each face image and the orthogonal projection parameter of the each face image relative to the face model.

3. The image processing method according to claim 2, wherein the projecting each three-dimensional point on the face model onto the plurality of face images comprises:
determining a position at which a three-dimensional point on the face model is projected onto the face images;
using, for a first position in the face images which only one three-dimensional point is projected onto, the three-dimensional point projected at the first position as a three-dimensional point corresponding to the first position; and
using, for a second position in the face images which a plurality of three-dimensional points are projected onto, a three-dimensional point having the least depth in the plurality of three-dimensional points as a three-dimensional point corresponding to the second position.

4. The image processing method according to claim 1, wherein the respectively extracting, partial texture images corresponding to the target region from the plurality of face images comprises:
determining, based on the correspondences and the target regions, a candidate region in each face image corresponding to the target regions; and
respectively extracting a partial texture image from the candidate region in the each face image corresponding to one of the target regions.

5. The image processing method according to claim 4, wherein the extracting a partial texture image from the candidate region in the each face image corresponding to one of the target regions comprises:
  determining, according to a view angle parameter corresponding to the each face image, a face orientation comprised in the each face image;
  determining, according to the face orientation comprised in the each face image, an image that needs to be extracted from the candidate region in the each face image corresponding to one of the target regions; and
  extracting the partial texture image from the each face image according to the image that needs to be extracted from one of the target regions in the each face image corresponding to the target region.

6. The image processing method according to claim 1, wherein the fusing the partial texture images that correspond to the target regions and that are respectively extracted from the plurality of face images comprises:
  fusing the extracted images corresponding to the target region by using a Laplacian pyramid fusion algorithm or a Poisson fusion algorithm.

7. The image processing method according to claim 1, wherein after the texture image is generated, the image processing method further comprises:
  determining a defect region that needs to be repaired in the texture image;
  obtaining a repaired image corresponding to the defect region from a pre-determined texture image, the pre-determined texture image being the 2D texture image template; and
  updating the texture image by adding the repaired image to the texture image and replacing the defect region with the repaired image.

8. The image processing method according to claim 7, further comprising:
  adjusting a color of the repaired image according to a color of the defect region.

9. The image processing method according to claim 7, wherein the determining a defect region that needs to be repaired in the texture image comprises:
  detecting a nostril region and/or a lip region in the texture image; and
  determining the nostril region and/or the lip region as the defect region.

10. The image processing method according to claim 1, wherein after the texture image is generated, the image processing method further comprises:
  calculating a spherical harmonic lighting coefficient of the texture image based on a spherical harmonic lighting model; and
  removing lighting in the texture image according to the spherical harmonic lighting coefficient.

11. The image processing method according to claim 1, wherein after the texture image is generated, the image processing method further comprises:
  calculating an average color of pixels in the texture image;
  generating a background image of the texture image by using the average color as a background color of the texture image;
  performing filtering processing on a border between the texture image and the background image to obtain a processed texture image; and
  rendering the face model by using the processed texture image.

12. The image processing method according claim 1, wherein building the 2D texture image template comprises:
  splitting the face model according to a designated cutting line, the face model being three-dimensional;
  spreading the face model along the cutting line to obtain the two-dimensional texture image template by taking the split face model as a cylinder and scaling columns of the cylinder to a same length;
  wherein designated regions in the 2D texture image template are selected as the target regions.

13. The method according to claim 12, further comprising:
  obtaining a 2D image from taking the split face model as the cylinder and scaling columns of the cylinder to the same length; and
  extracting a portion of the 2D image to be used as the 2D texture image template.

14. The method according to claim 1, wherein fusing the partial texture image to generate the texture image comprises:
  respectively filling the partial texture images to different portions of the 2D texture image template to generate the texture image, each portion being a connected pixel region.

15. An image processing apparatus, comprising:
  at least one memory storing a program; and
  at least one processor configured, when executing the program in the at least one memory, to:
  respectively project, according to a plurality of view angle parameters corresponding to a plurality of view angles, a face model of a target object onto a plurality of face images of the target object acquired from the plurality of view angles, to determine correspondences between regions on the face model and regions on the face image, the face model having a given topological structure;
  build a two-dimensional (2D) texture image template according to the face model;
  respectively extract, based on the correspondences and target regions in the face model that need to generate a texture image, partial texture images corresponding to the target regions from the plurality of face images, wherein each partial texture image represents texture of a connected pixel region on a face depicted by the plurality of face images; and
  fuse, according to the 2D texture image template, the partial texture images that correspond to the target regions and that are respectively extracted from the plurality of face images, to generate the texture image, the texture image being a 2D image.

16. The image processing apparatus according to claim 15, wherein the at least one processor is further configured to:
  determine, according to the view angle parameters, a rotation and translation parameter and an orthogonal projection parameter of each face image relative to the face model;
  determine a projection angle of the face model for the each face image according to the rotation and translation parameter of the each face image relative to the face model; and
  project each three-dimensional point on the face model onto the plurality of face images according to the projection angle of the face model for the each face image and the orthogonal projection parameter of the each face image relative to the face model.

17. The image processing apparatus according to claim 16, wherein the at least one processor is further configured to:

determine a position at which a three-dimensional point on the face model is projected onto the face images;

use, for a first position in the face images which only one three-dimensional point is projected onto, the three-dimensional point projected at the first position as a three-dimensional point corresponding to the first position; and use, for a second position in the face images which the plurality of three-dimensional points are projected onto, a three-dimensional point having the least depth in the plurality of three-dimensional points as a three-dimensional point corresponding to the second position.

18. The image processing apparatus according to claim 15, wherein the at least one processor is further configured to:

determine, based on the correspondences and the target regions, a candidate region in each face image corresponding to the target regions; and respectively extracting a partial texture image from the candidate region in the each face image corresponding to one of the target regions, wherein the candidate regions in the each face image correspond to different parts of a face depicted by the plurality of face images.

19. The image processing apparatus according to claim 18, wherein the at least one processor is further configured to:

determine, according to a view angle parameter corresponding to the each face image, a face orientation comprised in the each face image;

determine, according to the face orientation comprised in the each face image, an image that needs to be extracted from the candidate region in the each face image corresponding to one of the target regions; and extract the partial texture image from the each face image according to the image that needs to be extracted from one of the target regions in the each face image corresponding to the target region.

20. A non-transitory computer-readable medium, storing a computer program, the computer program, when executed by at least one processor, causing the at least one processor to perform a plurality of operations comprising:

respectively projecting, according to a plurality of view angle parameters corresponding to a plurality of view angles, a face model of a target object onto a plurality of face images of the target object acquired from the plurality of view angles, to determine correspondences between regions on the face model and regions on the face image, the face model having a given topological structure;

building a two-dimensional (2D) texture image template according to the face model;

respectively extracting, based on the correspondences and target regions in the face model that need to generate a texture image, partial texture images corresponding to the target regions from the plurality of face images, wherein each partial texture image represents texture of a connected pixel region on a face depicted by the plurality of face images; and fusing, according to the 2D texture image template, the partial texture images that correspond to the target regions and that are respectively extracted from the plurality of face images, to generate the texture image, the texture image being a 2D image.

* * * * *